Sept. 12, 1933. C. DEKKER 1,926,476
ONION SET PLANTER
Filed May 12, 1932 2 Sheets-Sheet 1
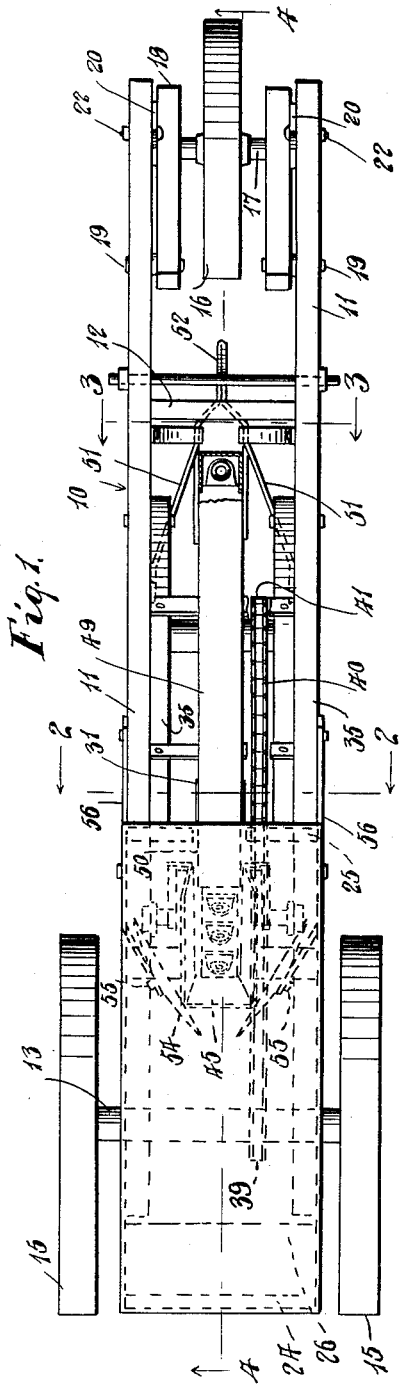
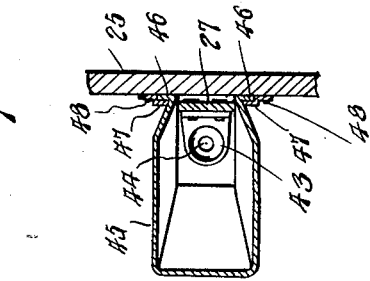
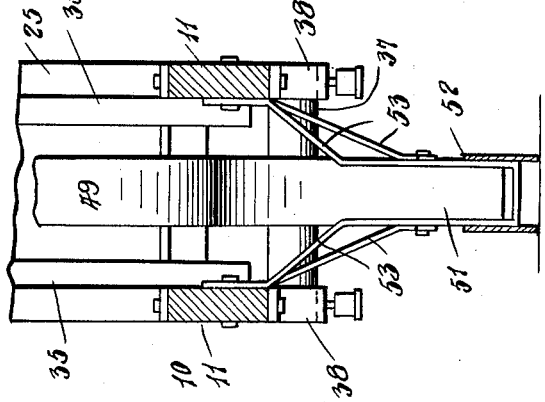
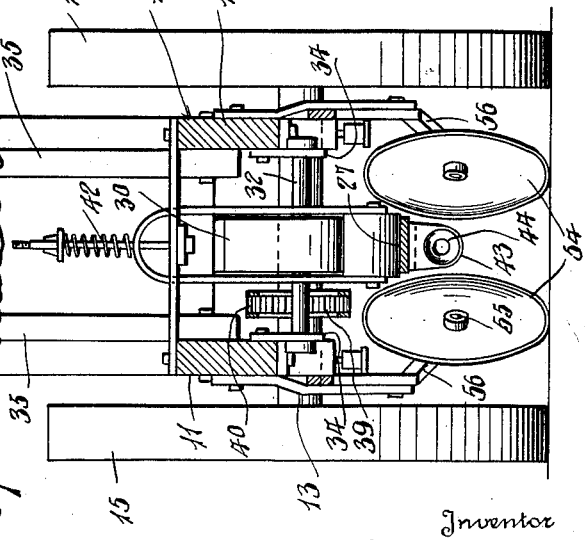
Inventor
C. Dekker.
By [signature]
Attorney Sept. 12, 1933.  C. DEKKER  1,926,476
ONION SET PLANTER
Filed May 12, 1932   2 Sheets-Sheet 2
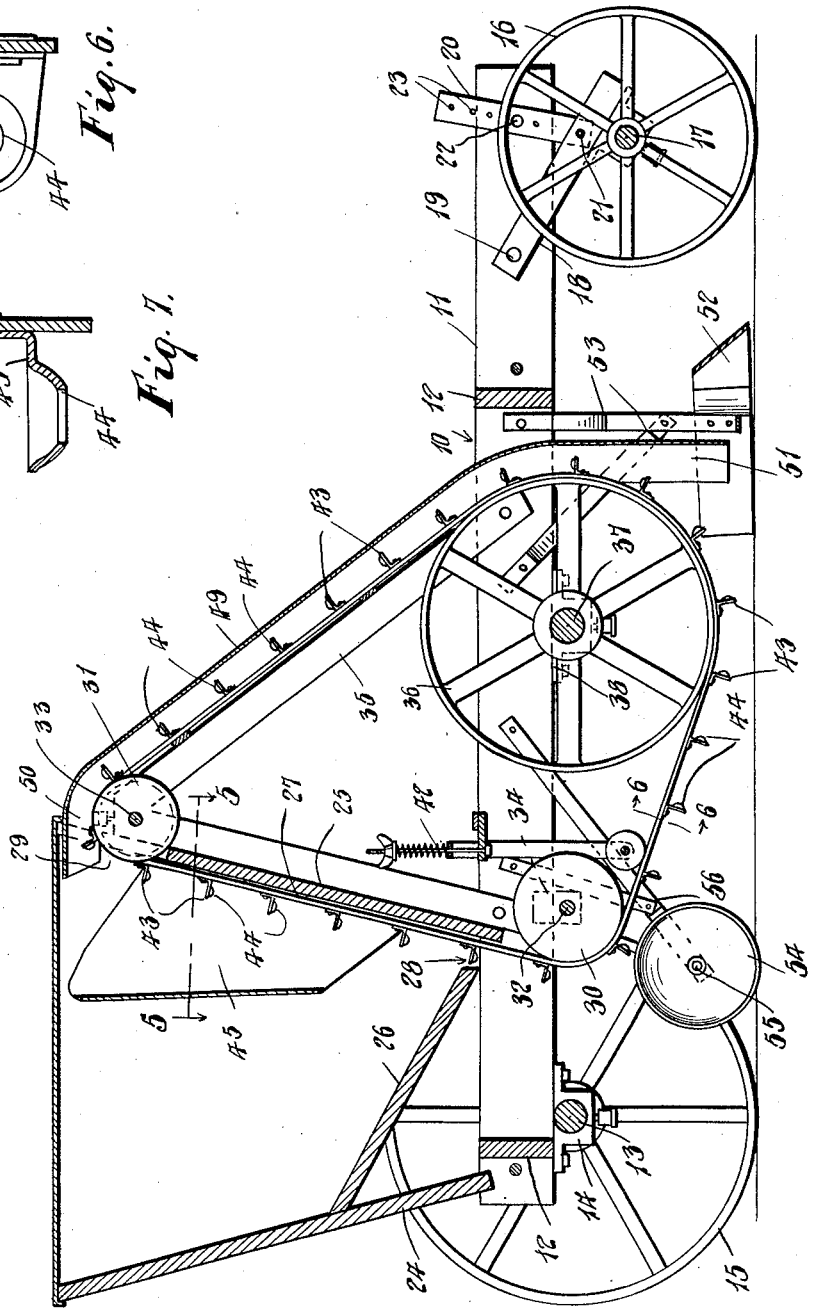

Patented Sept. 12, 1933

1,926,476

UNITED STATES PATENT OFFICE 1,926,476

ONION SET PLANTER

Corneil Dekker, Oakglen, Ill.

Application May 12, 1932. Serial No. 610,917

1 Claim. (Cl. 221—128)

This invention relates to a machine for planting or sowing onion sets, gladiolus bulbs, and the like.

It is primarily aimed to provide a novel and compact machine having the planting mechanism operable through the traction of the vehicle, with an endless element adapted to convey the onion sets from a hopper and discharge them behind a furrow opener, which furrow is later closed by the wheels.

Another object is to provide a novel means within the hopper coacting with the belt in order to regulate the supply of onions to the belt.

The more specific objects and advantages will become apparent from a consideration of the description following taken in connection with the accompanying drawings illustrating an operative embodiment.

In said drawings:—

Figure 1 is a view of the planter in plan,

Figure 2 is a cross sectional view taken on the line 2—2 of Figure 1,

Figure 3 is a cross sectional view taken on the line 3—3 of Figure 1,

Figure 4 is a longitudinal sectional view taken on the line 4—4 of Figure 1,

Figure 5 is a cross sectional view taken on the line 5—5 of Figure 4,

Figure 6 is a cross sectional view taken on the line 6—6 of Figure 4, and

Figure 7 is a cross sectional view taken on the line 7—7 of Figure 6.

Referring specifically to the drawings, the planter comprises a suitable frame 10 made up of side beams 11 and transverse beams 12 connecting them. Such frame mounts a rear axle 13 which is journaled in bearings 14 on the frame, and on which axle rear ground wheels 15 are keyed. At the front of the machine, a central ground wheel 16 is provided, the same being journaled on an axle 17 carried by bars 18 and pivoted at 19 to the beams 11. Bars 18 are suspended by bars 20 which are pivoted thereto at 21 and which are adjustably secured in place by bolts 22 passing through a series of openings 23 thereof. Through the adjustment of the bolts 22, the height of the front wheels may be varied to regulate the depth of operation of the machine.

Suitably secured to the frame 10 is a hopper 24 adapted to contain onion sets, gladiolus bulbs, or the like to be planted. The front wall of the hopper is shown at 25 and inclined upwardly and forwardly. The bottom wall of the hopper 26 inclines downwardly and forwardly so as to direct the set or bulb toward the wall 25.

An endless feed or planting belt is shown at 27 which passes interiorly of the hopper and over the wall 25, entering the hopper through an opening 28 in its bottom wall and leaving through an opening 29 at the top of the front wall. Such belt is trained over pulleys 30 and 31, adjacent such openings which are keyed to shafts 32 and 33, respectively. Shaft 32 is journaled in bearings 34 secured to the side members 11, while shaft 33 is journaled in the apex portion of V-shape brackets 35 secured to the frame members 11. The belt 27 is also trained over a large pulley 36 keyed to a shaft 37, journaled in bearings 38 on the frame 10. Pulley 36 serves as the drive wheel for the belt, receiving its power from the rear axle 13, since the latter has a sprocket wheel 39 thereon driving a sprocket chain 40, which in turn is trained over a sprocket wheel 41 keyed to the shaft 37. Any suitable belt tightening or tensioning means may be employed at 42.

It will be seen that as the belt 27 ascends in the hopper 24, cups 43 thereon of any suitable shape, and preferably perforated as at 44, each receives and holds an onion set or the like, the same falling toward the same due to the inclination of the bottom 26. To prevent undue crowding of the onion sets or the like towards the belt and front wall 25, a vertically slidable guard member is provided at 45, the same being substantially U-shape in cross section as best seen in Figure 5 and open at top and bottom. The guard 45 has laterally extending flanges 46 engaging the wall 25 and held adjustably against the same by means of cleats or clamps 47, and screws 48. Through the adjustment of the screws and clamps 47 and 48, the slide 45 may be moved vertically to govern the feed or crowding or prevent crowding of the onion sets or the like.

A relatively narrow hood of inverted U-shape in cross section, is provided at 49 over the forward run of the conveyor 27, its uppermost portion 50 extending through the opening 29 into the hopper and its forward portion being vertical as at 51 terminating relatively close to the ground and serving to guide the onion sets or the like, in discharging into the furrow.

Slightly in advance of the portion 51 is a suitable furrow opening plow or means 52, supported from the machine by suitable bars as at 53. The onion sets or the like will drop into the furrow opened by the plow 52 and such furrow after the dropping of the sets will be covered by the diverging wheels or disks 54 which are journaled on stub shafts 55 carried by mounting brackets 56 or the like secured to the frame members 11.

Various changes may be resorted to provided they fall within the spirit and scope of the invention.

What is claimed is:—

A planting machine of the class described having a mobile frame, a hopper thereon, an endless planting belt movable through the hopper, a guard in the hopper to prevent undue crowding of the material therein toward the conveyor, the hopper adjacent top and bottom at the front thereof having openings through which the conveyor passes, a guard of U-shape in cross section disposed over the conveyor within the hopper, said guard having flanges thereon, and means engaging the flanges and securing the guard in adjusted position.

CORNEIL DEKKER.